UNITED STATES PATENT OFFICE.

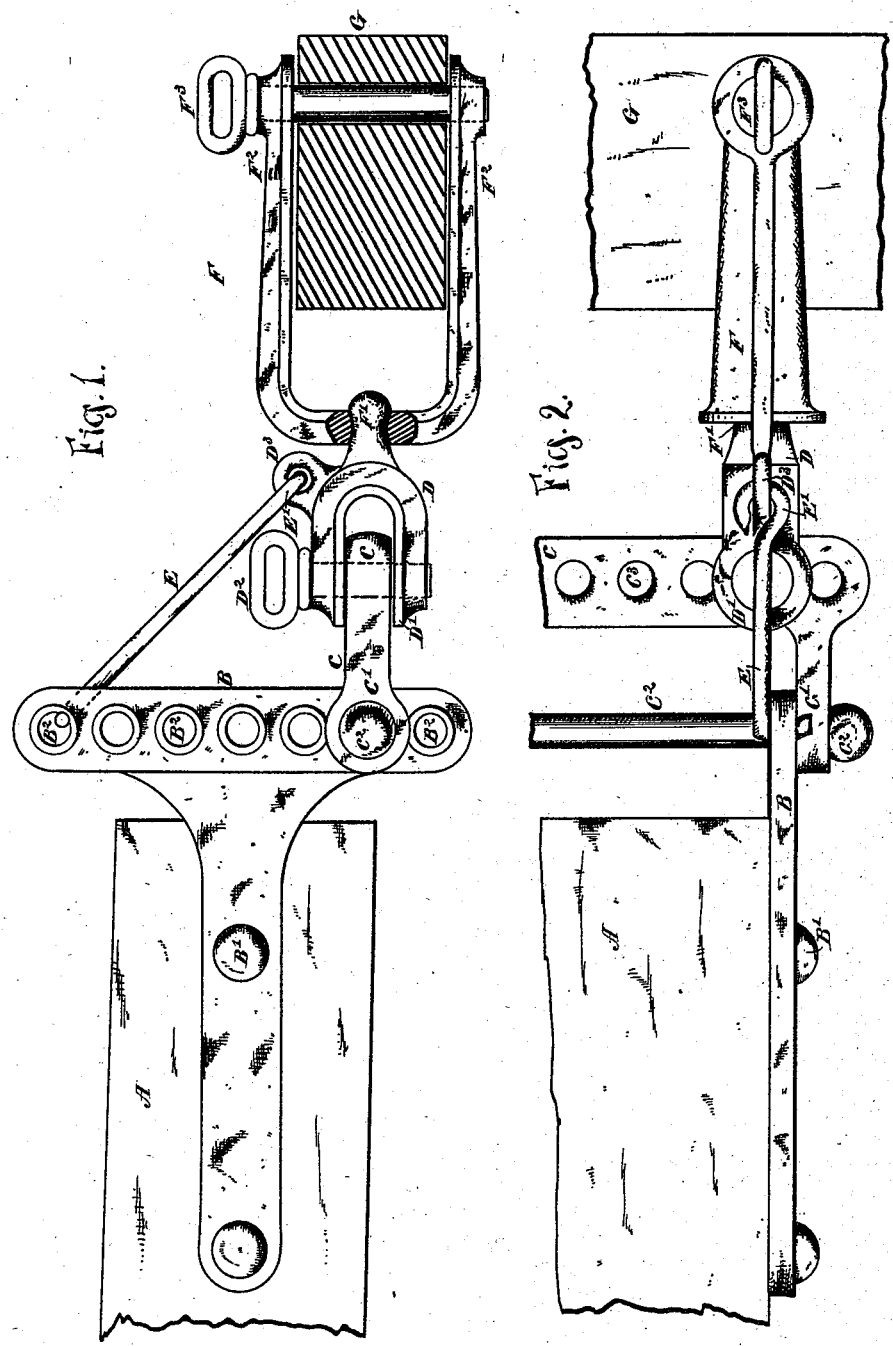

LEWIS A. WEYBURN AND GEORGE S. BRIGGS, OF ROCKFORD, ILLINOIS.

CLEVIS FOR PLOWS.

SPECIFICATION forming part of Letters Patent No. 376,792, dated January 24, 1888.

Application filed May 18, 1887. Serial No. 238,626. (No model.)

*To all whom it may concern:*

Be it known that we, LEWIS A. WEYBURN and GEORGE S. BRIGGS, citizens of the United States, residing at Rockford, in the county of Winnebago and State of Illinois, have invented certain new and useful Improvements in Clevises for Plows, of which the following is a specification.

The object of this invention is to produce a combination-clevis, and to attach the same to a plow-beam in such a manner that a doubletree and singletrees connected therewith and supported thereby will not drop down upon the heels of draft-animals hitched thereto whenever said animals turn at an angle with the plow-beam or materially lessen the draft thereon.

The invention consists in certain new and useful constructions and combinations, hereinafter described and claimed.

Referring to the accompanying drawings, which form a part of this specification, Figure 1 is a view of a side elevation of our improvement. Fig. 2 is a plan view mutilated.

Like letters of reference indicate corresponding parts throughout the several views.

A represents the free end of the plow-beam.

B represents draft-plates secured to the beam A by means of the bolts B', and provided with a series of pin-holes, $B^2$.

C represents a horizontal clevis having pin-holes through the free ends of the arm C thereof, through which is passed a pin, $C^2$, for connecting the same with the draft-plates B, and also provided with a series of pin-holes, $C^3$.

D represents a vertical clevis having a pin-hole in the free ends of the arms D' thereof, through which is inserted a pin, $D^2$.

$D^3$ represents an eye formed integrally with and projecting upwardly from the clevis D.

E represents a double hook made of strong wire, having the lower end passed through the eye $D^3$ of the clevis D and the upper end inserted into one of the pin-holes $B^2$ in the draft-plate B.

F represents a vertical doubletree-clevis connected with the clevis D by means of a swivel-joint, F', and having pin-holes in the ends of the arms $F^2$ thereof, through which is passed a pin, $F^3$.

G represents a doubletree pivoted to the clevis F by means of the pin $F^3$.

The swivel-joint F' allows the ends of the doubletree G and the singletrees (not shown) connected therewith free upward and downward motion.

The hook E maintains the combined clevises C, D, and F in a substantially horizontal position, thereby most effectually preventing the doubletree G and singletrees connected therewith from coming in contact with the heels of draft-animals hitched to said singletrees for the purpose of drawing a plow.

We claim—

The combination, with the series of clevises herein shown and described, of a pair of draft-plates connected therewith by means of a pin, $C^2$, and a double hook, E, for maintaining said series of clevises in a substantially horizontal position, and thereby preventing a doubletree, G, and singletrees connected therewith from coming in contact with the heels of draft-animals, substantially as described, and for the purpose specified.

LEWIS A. WEYBURN.
GEORGE S. BRIGGS.

Witnesses:
H. C. SOUTHGATE,
L. L. MORRISON.